US007921381B2

(12) United States Patent  
Petersen et al.

(10) Patent No.: US 7,921,381 B2
(45) Date of Patent: Apr. 5, 2011

(54) METHOD AND APPARATUS FOR DISPLAYING TEST DATA

(75) Inventors: Kristin Petersen, Clifton Park, NY (US); Carli Connally, Fort Collins, CO (US)

(73) Assignee: Verigy (Singapore) Pte. Ltd., Singapore (SG)

( * ) Notice: Subject to any disclaimer, the term of this patent is extended or adjusted under 35 U.S.C. 154(b) by 739 days.

(21) Appl. No.: 11/740,670

(22) Filed: Apr. 26, 2007

(65) Prior Publication Data

US 2008/0270942 A1 Oct. 30, 2008

(51) Int. Cl.
*G06F 3/00* (2006.01)
*G06F 3/048* (2006.01)
(52) U.S. Cl. ........ 715/840; 715/765; 715/835; 702/179; 702/108; 714/46
(58) Field of Classification Search .................. 715/700, 715/764, 765, 781.804, 809, 810; 702/57, 702/107, 108, 117, 118, 179–183; 714/25, 714/38, 46, 57, 37
See application file for complete search history.

(56) References Cited

U.S. PATENT DOCUMENTS

| | | | | |
|---|---|---|---|---|
| 7,178,065 | B2 * | 2/2007 | Dinker et al. | 714/41 |
| 7,184,923 | B2 * | 2/2007 | Ishizuka | 702/127 |
| 7,373,263 | B2 * | 5/2008 | Cohn et al. | 702/57 |
| 7,412,344 | B2 * | 8/2008 | Chang et al. | 702/121 |
| 2003/0046663 | A1 * | 3/2003 | Rogers et al. | 717/125 |
| 2003/0131085 | A1 * | 7/2003 | Zhang et al. | 709/223 |
| 2004/0039550 | A1 * | 2/2004 | Myers | 702/186 |
| 2006/0066339 | A1 * | 3/2006 | Rajski et al. | 324/765 |
| 2006/0070037 | A1 * | 3/2006 | Canning et al. | 717/127 |
| 2006/0122803 | A1 * | 6/2006 | Dorough et al. | 702/118 |
| 2007/0010970 | A1 * | 1/2007 | Bramwell et al. | 702/183 |
| 2008/0163015 | A1 * | 7/2008 | Kagan et al. | 714/724 |
| 2008/0184206 | A1 * | 7/2008 | Vikutan | 717/127 |

* cited by examiner

Primary Examiner — Xiomar Bautista
(74) Attorney, Agent, or Firm — Holland & Hart, LLP

(57) ABSTRACT

In one embodiment, a plurality of test data entries are successively displayed via a graphical user interface (GUI), with each of the test data entries including at least a test result identifier and a corresponding test result. For at least one of the test data entries, a user-selectable mechanism is provided via the GUI. When the user-selectable mechanism is selected, statistical data based on multiple executions of a test identified by a particular one of the test data entries is caused to be displayed via the GUI. Other embodiments are also disclosed.

29 Claims, 8 Drawing Sheets

| Low Limit | High Limit | Units | Test Execution Count | Yield | Min | Max | Avg | Standard Deviation |
|---|---|---|---|---|---|---|---|---|
| 52 | 150 | dB | 100 | 65 | 49.0 | 56.0 | 53.0 | 1.30 |

FIG. 6

| Wafer ID | Low Limit | High Limit | Units | Test Execution Count | Yield | Min | Max | Avg | Standard Deviation |
|---|---|---|---|---|---|---|---|---|---|
| 20 | 52 | 150 | dB | 100 | 70 | 49.0 | 56.0 | 53.0 | 1.30 |
| 21 | 52 | 150 | dB | 100 | 68 | 49.1 | 56.1 | 53.2 | 1.32 |
| 22 | 52 | 150 | dB | 100 | 65 | 49.0 | 56.0 | 53.0 | 1.30 |
| 23 | 52 | 150 | dB | 100 | 63 | 50.0 | 58.0 | 52.0 | 1.60 |
| 24 | 52 | 150 | dB | 100 | 67 | 49.1 | 56.1 | 53.2 | 1.32 |
| 25 | 52 | 150 | dB | 100 | 70 | 49.1 | 56.1 | 53.2 | 1.32 |
| 26 | 52 | 150 | dB | 100 | 72 | 49.0 | 58.0 | 51.0 | 1.20 |
| 27 | 52 | 150 | dB | 100 | 76 | 49.2 | 58.2 | 51.3 | 1.10 |
| 28 | 52 | 150 | dB | 100 | 80 | 49.1 | 56.1 | 53.2 | 1.32 |
| 29 | 52 | 150 | dB | 100 | 73 | 49.0 | 58.0 | 51.0 | 1.20 |
| 30 | 52 | 150 | dB | 100 | 75 | 49.0 | 58.0 | 51.0 | 1.20 |
| 31 | 52 | 150 | dB | 100 | 81 | 49.1 | 56.1 | 53.2 | 1.32 |
| 32 | 52 | 150 | dB | 100 | 84 | 49.0 | 56.0 | 53.0 | 1.30 |
| 33 | 52 | 150 | dB | 100 | 79 | 49.2 | 58.2 | 51.3 | 1.10 |
| 34 | 52 | 150 | dB | 100 | 85 | 49.0 | 56.0 | 53.0 | 1.30 |
| 35 | 52 | 150 | dB | 100 | 83 | 49.1 | 56.1 | 53.2 | 1.32 |
| 36 | 52 | 150 | dB | 100 | 81 | 49.1 | 56.1 | 53.2 | 1.32 |
| 37 | 52 | 150 | dB | 100 | 89 | 49.0 | 56.0 | 53.0 | 1.30 |

FIG. 7

| Pin Name | Low Limit | High Limit | Units | Test Execution Count | Yield | Min | Max | Avg | Standard Deviation |
|---|---|---|---|---|---|---|---|---|---|
| pin_001 | 52 | 150 | dB | 100 | 65 | 49.0 | 56.0 | 53.0 | 1.30 |
| pin_002 | 52 | 150 | dB | 100 | 79 | 49.2 | 58.2 | 51.3 | 1.10 |

FIG. 8

| Fail | Part ID | Site | Test Number | Low Limit | | Result | Units | | High Limit |
|---|---|---|---|---|---|---|---|---|---|
|  | 1 | 1 | 71 | 52.000 | <= | 53.1 | dB | <= | 150.000 |
|  | 2 | 2 | 71 | 52.000 | <= | 53.9 | dB | <= | 150.000 |
|  | 3 | 3 | 71 | 52.000 | <= | 53.0 | dB | <= | 150.000 |
| ✖ | 4 | 4 | 71 | 52.000 | <= | 49.0 | dB | <= | 150.000 |
| ✖ | 5 | 5 | 71 | 52.000 | <= | 49.2 | dB | <= | 150.000 |
| ✖ | 6 | 1 | 71 | 52.000 | <= | 50.3 | dB | <= | 150.000 |
|  | 7 | 2 | 71 | 52.000 | <= | 53.0 | dB | <= | 150.000 |
|  | 8 | 3 | 71 | 52.000 | <= | 54.1 | dB | <= | 150.000 |
|  | 9 | 4 | 71 | 52.000 | <= | 55.0 | dB | <= | 150.000 |
|  | 10 | 5 | 71 | 52.000 | <= | 56.0 | dB | <= | 150.000 |
| ✖ | 11 | 1 | 71 | 52.000 | <= | 50.1 | dB | <= | 150.000 |
|  | 12 | 2 | 71 | 52.000 | <= | 55.4 | dB | <= | 150.000 |
|  | 13 | 3 | 71 | 52.000 | <= | 54.1 | dB | <= | 150.000 |
|  | 14 | 4 | 71 | 52.000 | <= | 56.0 | dB | <= | 150.000 |
|  | 15 | 5 | 71 | 52.000 | <= | 52.1 | dB | <= | 150.000 |
|  | 16 | 1 | 71 | 52.000 | <= | 53.2 | dB | <= | 150.000 |
| ✖ | 17 | 2 | 71 | 52.000 | <= | 49.8 | dB | <= | 150.000 |
|  | 18 | 3 | 71 | 52.000 | <= | 52.1 | dB | <= | 150.000 |
| ✖ | 19 | 4 | 71 | 52.000 | <= | 50.7 | dB | <= | 150.000 |
| ✖ | 20 | 5 | 71 | 52.000 | <= | 50.1 | dB | <= | 150.000 |
| ✖ | 21 | 1 | 71 | 52.000 | <= | 51.0 | dB | <= | 150.000 |
|  | 22 | 2 | 71 | 52.000 | <= | 55.1 | dB | <= | 150.000 |
|  | 23 | 3 | 71 | 52.000 | <= | 54.1 | dB | <= | 150.000 |
|  | 24 | 4 | 71 | 52.000 | <= | 53.3 | dB | <= | 150.000 |
|  | 25 | 5 | 71 | 52.000 | <= | 53.2 | dB | <= | 150.000 |
|  | 26 | 1 | 71 | 52.000 | <= | 53.9 | dB | <= | 150.000 |
|  | 27 | 2 | 71 | 52.000 | <= | 54.1 | dB | <= | 150.000 |
|  | 28 | 3 | 71 | 52.000 | <= | 52.0 | dB | <= | 150.000 |
| ✖ | 29 | 4 | 71 | 52.000 | <= | 50.4 | dB | <= | 150.000 |
| ✖ | 30 | 5 | 71 | 52.000 | <= | 51.2 | dB | <= | 150.000 |
|  | 31 | 1 | 71 | 52.000 | <= | 53.9 | dB | <= | 150.000 |
|  | 32 | 2 | 71 | 52.000 | <= | 53.4 | dB | <= | 150.000 |
|  | 33 | 1 | 71 | 52.000 | <= | 53.9 | dB | <= | 150.000 |

METHOD AND APPARATUS FOR DISPLAYING TEST DATA

BACKGROUND

When testing circuit devices such as system-on-a-chip (SOC) devices, various types of test data may be logged, such as test results, test result identifiers, test limits, vector data, statistical data, waveform data and schmoo data. Portions of the test data that are reasonably concise, and that can be understood when displayed in a simple alphanumeric format, are sometimes displayed to a user in "real-time". However, test data that is best understood when displayed in pictorial, verbose, or other non-standard form, is typically not displayed.

BRIEF DESCRIPTION OF THE DRAWINGS

Illustrative embodiments of the invention are illustrated in the drawings, in which:

FIGS. 6-8 illustrate various alternative tables of statistical data that may be displayed via the statistical data window shown in FIG. 5.

DETAILED DESCRIPTION

Figure 1:
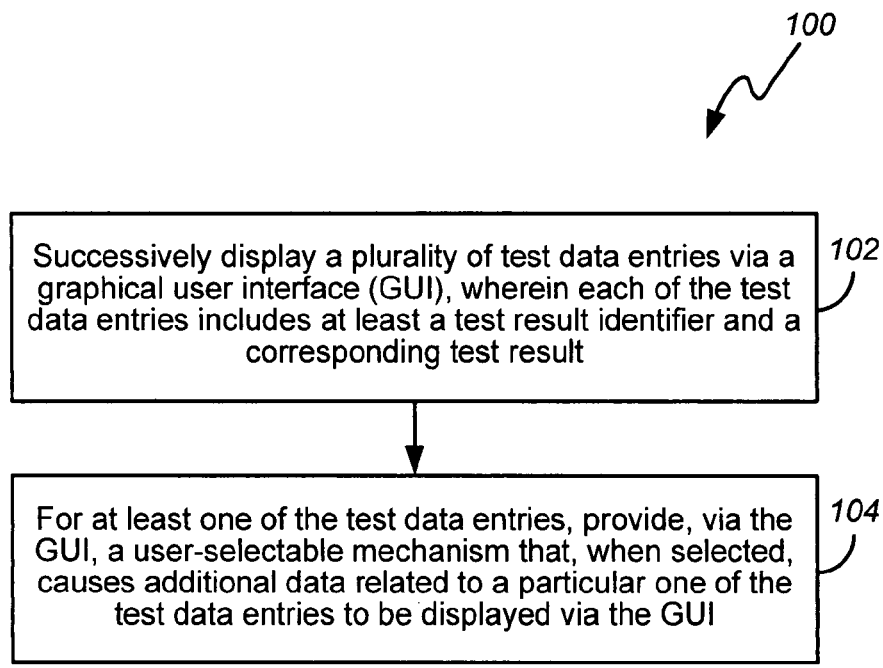
FIG. 1 illustrates a first exemplary method for displaying test data.

As a preliminary manner, it is noted that, in the following description, like reference numbers appearing in different drawing figures refer to like elements/features. Often, therefore, like elements/features that appear in different drawing figures will not be described in detail with respect to each of the drawing figures.

In accord with one embodiment of the invention, FIG. 1 illustrates a computer-implemented method 100 in which a plurality of test data entries (for tests or measurements) are successively displayed via a graphical user interface (GUI). See, block 102. Each of the test data entries includes at least a test result identifier and a corresponding test result. In one embodiment, the test data entries may pertain to tests of a system-on-a-chip (SOC) device, such as tests that have been executed by the V93000 SOC tester distributed by Verigy Ltd. However, the test data entries could also pertain to tests that are executed by other sorts of testers, or tests that are executed on other sorts of circuit devices. In one embodiment, the items of test data included in the test data entries may be provided by, or derived from, one of the data formatters disclosed in the United States patent application of Connally, et al. entitled "Apparatus for Storing and Formatting Data" (Ser. No. 11/345,040).

Some of the test data entries that are displayed during execution of the method 100 may correspond to single test results, whereas other entries may correspond to subsets of test results, such as a number of test results generated by performing the same test on a plurality of device pins. By way of example, the test result identifiers may comprise test names or test numbers; and the test results may comprise pass/fail indications or measurements. Test data entries may also include other data items, such as test limits (e.g., if a test is a measurement).

A user-selectable mechanism is provided for at least one of the test data entries via the GUI (see, block 104). When the user-selectable mechanism is selected, additional data related to a particular one of the test data entries is caused to be displayed via the GUI. By way of example, the additional data may be vector data, waveform data, or schmoo data.

Figure 2:
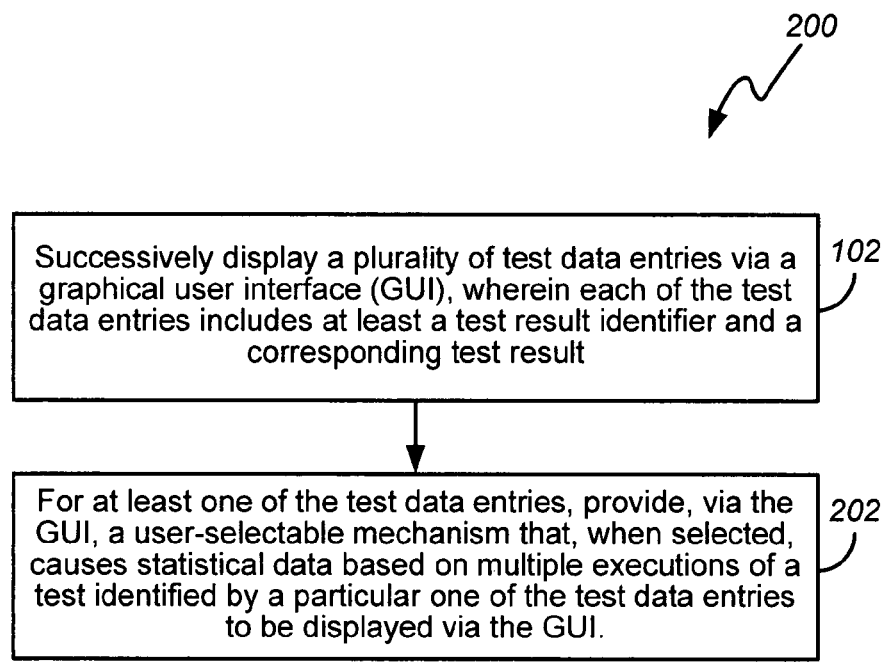
FIG. 2 illustrates a second exemplary method for displaying test data.

FIG. 2 illustrates a variation 200 of the method 100, wherein the "additional data" displayed via the GUI comprises statistical data, and the statistical data is based on multiple executions of a test identified by a particular one of the test data entries. See, block 202. By way of example, the statistical data may include one or more alpha-numeric statistics; or one or more graphical representations of data groupings, such as a histogram.

The methods 100 and 200 are useful in that data items that can be easily conformed to a common format, such as a table, can be displayed as part of the test data entries; and data items that are pictorial or verbose, or that otherwise require display in a non-standard format, can be displayed as part of the "additional data". The method 100 also enables the display of additional data that is related to a particular one (i.e., an individual one) of the test data entries. This is believed useful in that test data is typically displayed in bulk form, such as a continuously appended to list. When test data is displayed in bulk form, there is usually no mechanism provided for selecting an individual test data entry, therefore making it next to impossible to request or obtain additional data related to a single test data entry.

The methods 100, 200 shown in FIGS. 1 & 2 may be implemented by means of computer-readable code stored on computer-readable media. The computer-readable media may include, for example, any number or mixture of fixed or removable media (such as one or more fixed disks, random access memories (RAMs), read-only memories (ROMs), or compact discs), at either a single location or distributed over a network. The computer readable code will typically comprise software, but could also comprise firmware or a programmed circuit.

Figure 3:
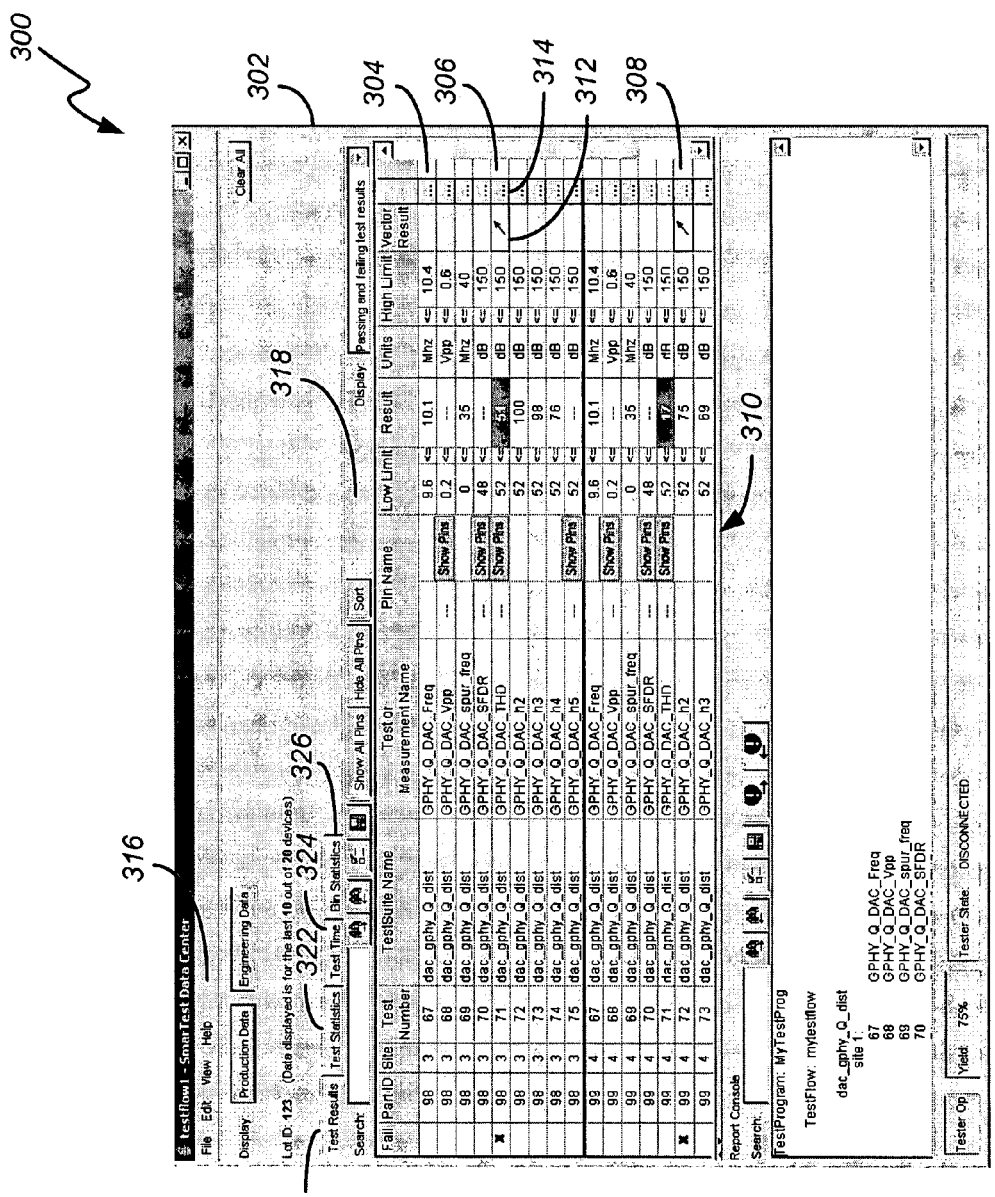
FIGS. 3-5 and 9-11 illustrate various exemplary windows of a GUI via which the methods shown in FIGS. 1 & 2 may be implemented.

FIGS. 3-5 and 9-11 illustrate various exemplary windows (or screens) of a GUI 300 via which the method 100 or method 200 may be implemented. FIG. 3 illustrates a first window 302 via which a plurality of test data entries (such as entries 304, 306, 308) are displayed. By way of example, each test data entry 304, 306, 308 comprises three test result identifiers, including: a "Test Number", a "Test or Measurement Name", and a "TestSuite Name" that identifies a test suite to which the test name and number belong. In addition, each test data entry 304, 306, 308 comprises: information identifying the test resources via which a test result was acquired (e.g., a test "Site" number), and information identifying the device and pin for which a test result was acquired (e.g., a device "Part ID", and a device "Pin Name"). Each test data entry 304, 306, 308 also comprises one or more test results, which may take forms such as a value in a "Result" field and/or a check in a "Fail" field (e.g., for those tests that have failed). For measurement-type test results, "Low Limit" and "High Limit" fields may also be populated.

Preferably, the window 302 is displayed during execution of a plurality of tests on which the test data entries 304, 306, 308 are based (i.e., during test of a device under test). New test results can then be displayed via the window as they are acquired, and a user can be provided a "real-time" display of test results. Alternately, device testing can be completed, and a log of test results can be saved to volatile or non-volatile storage (e.g., memory or a hard disk). The test results can then be read and displayed in succession via the window 302 (i.e., not in real-time). Typically, the test data entries 304, 306, 308 that are displayed at any one time represent only some of the test data entries or items that are generated during execution of a plurality of tests. One or more mechanisms such as a scroll bar may be provided to allow a user to navigate to different test data entries or items.

As further shown in FIG. 3, each of the test data entries may be displayed as a line of a table 310, with different lines of the table corresponding to different ones of the test data entries 304, 306, 308. For purposes of this description, a "table" is defined to be either an integrated structure wherein data is displayed in tabular form, or multiple structures that, when displayed side-by-side, enable a user to review information in rows and columns.

In FIG. 3, the mechanism for acquiring a display of additional data related to a particular one of the test data entries 306 is a button 312 contained within a line of the table 310 that corresponds to the particular test data entry 306. The window 302 actually displays two buttons 312, 314 for some of the test data entries. One of the buttons 312 has a vector icon thereon (for obtaining vector data), and another of the buttons 314 has a set of ellipses thereon (for accessing statistical data based on multiple executions of a test corresponding to a particular one of the test data entries). Other buttons or user-selectable mechanisms can be provided to enable the display of different ones of a plurality of different "additional data" items that are related to a particular test data entry.

In one embodiment, buttons 312, 314 that are used to launch the display of "additional data" are only provided (e.g., shown or enabled) when additional data is available. Thus, for example, FIG. 3 might only provide a vector button 312 when vector data is available for a particular test data entry 306 of the table 310. For other entries, a field for such a button may be provided, but the button itself may not be shown or enabled. Alternately, a button could be displayed for each test data entry of the table 310, and use of the button could simply cause the display of a "no results" message.

When additional data is available for each of a plurality of test data entries 304, 306, 308, a user-selectable mechanism for obtaining the additional data may be provided for each of the test data entries. For example, buttons 314 having ellipses thereon are provided for each of the test data entries 304, 306, 308 shown in FIG. 3, thereby enabling the display of statistical data for each of the test data entries 304, 306, 308.

Instead of, or in addition to, implementing user-selectable mechanisms for obtaining "additional data" as buttons 312, 314, a GUI 300 could provide other sorts of user-selectable mechanisms. For example, a GUI 300 could implement the user-selectable mechanism as a menu item that is obtained, for example, by 1) right-clicking on a particular test data entry 304 (e.g., a line of the table 310 shown in FIG. 3) to obtain a pop-up menu, or by 2) selecting a test data entry 304 and then clicking on a drop-down menu header of a menu bar 316. Alternately, a single button could be provided on a graphical toolbar 318, and the single button could be configured to launch the display of "additional data" for various test data entries 304, 306, 308 by A) first selecting a particular one of the test data entries, and then B) pressing the button.

If only a single "additional data" item is available for each test data entry 304, 306, 308, then the user-selectable mechanism for accessing the additional data could be implemented as a number of graphical pointer clicks (e.g., a single or double mouse click) on the test data entry.

Although the above-described mechanisms require different numbers of steps for accessing the "additional data" that pertains to a particular test data entry, it is noted that those requiring only a single graphical pointer click may be preferred.

Upon selection of the user-selectable mechanism 312 or 314 for accessing additional data, the additional data may then be displayed in one of several ways. In one embodiment, the additional data is displayed by launching a second window of the GUI 300, and then displaying the additional data in the second window. Alternately, the display of data in the first window 302 could be temporarily adjusted to make room for the additional data (such as, by 1) adding space between two successive test data entries, and filling the space with a chart, picture, or secondary table, or 2) increasing the length of the window 302 to display additional data below the table 310).

Figure 4:
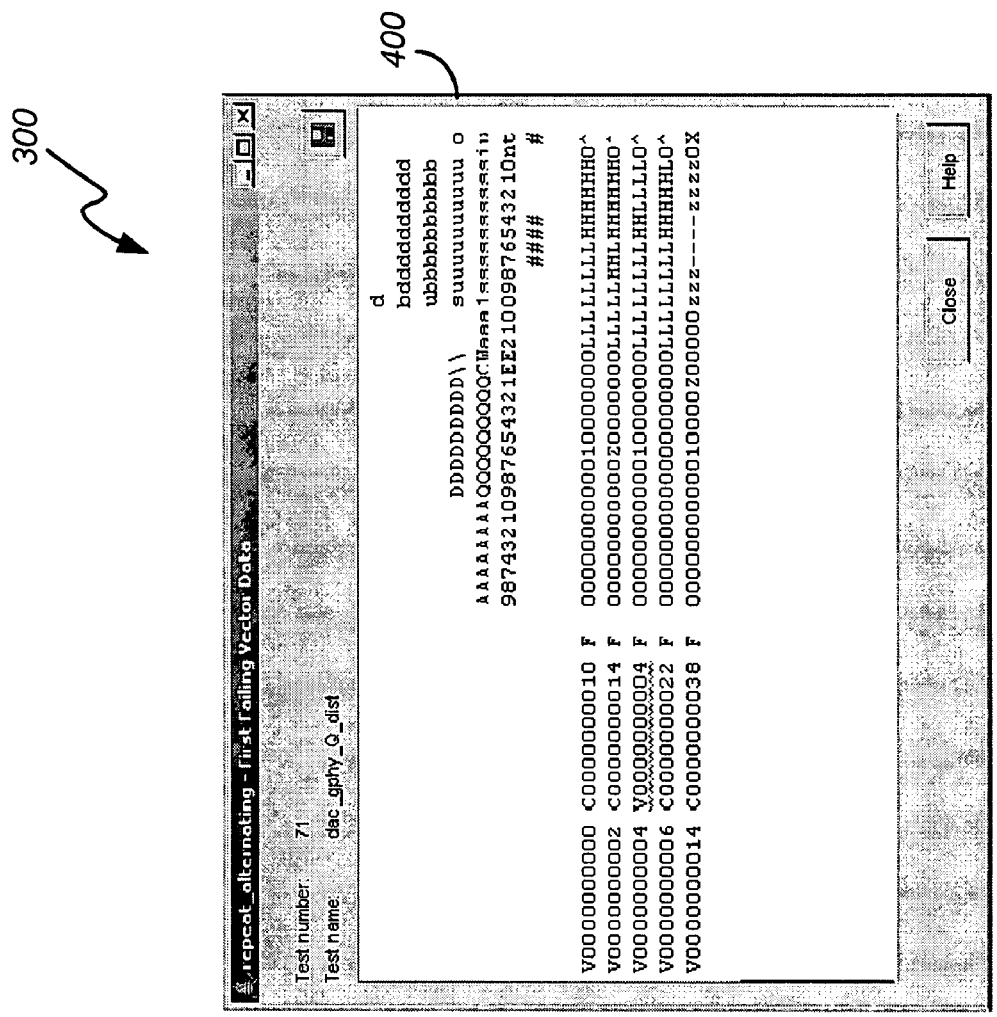

FIG. 4 illustrates an exemplary window 400 that could be launched upon a user pressing the vector button 312 shown in FIG. 3. The window 400 provides a display of failing vector data corresponding to Test Number 71. In one embodiment, the format of the failing vector data could be obtained from a test developer. In another embodiment, the format of the failing vector data could be dictated by a software developer. That is, one or more predetermined (or "canned") formats could be provided as part of a software application.

Figure 5:
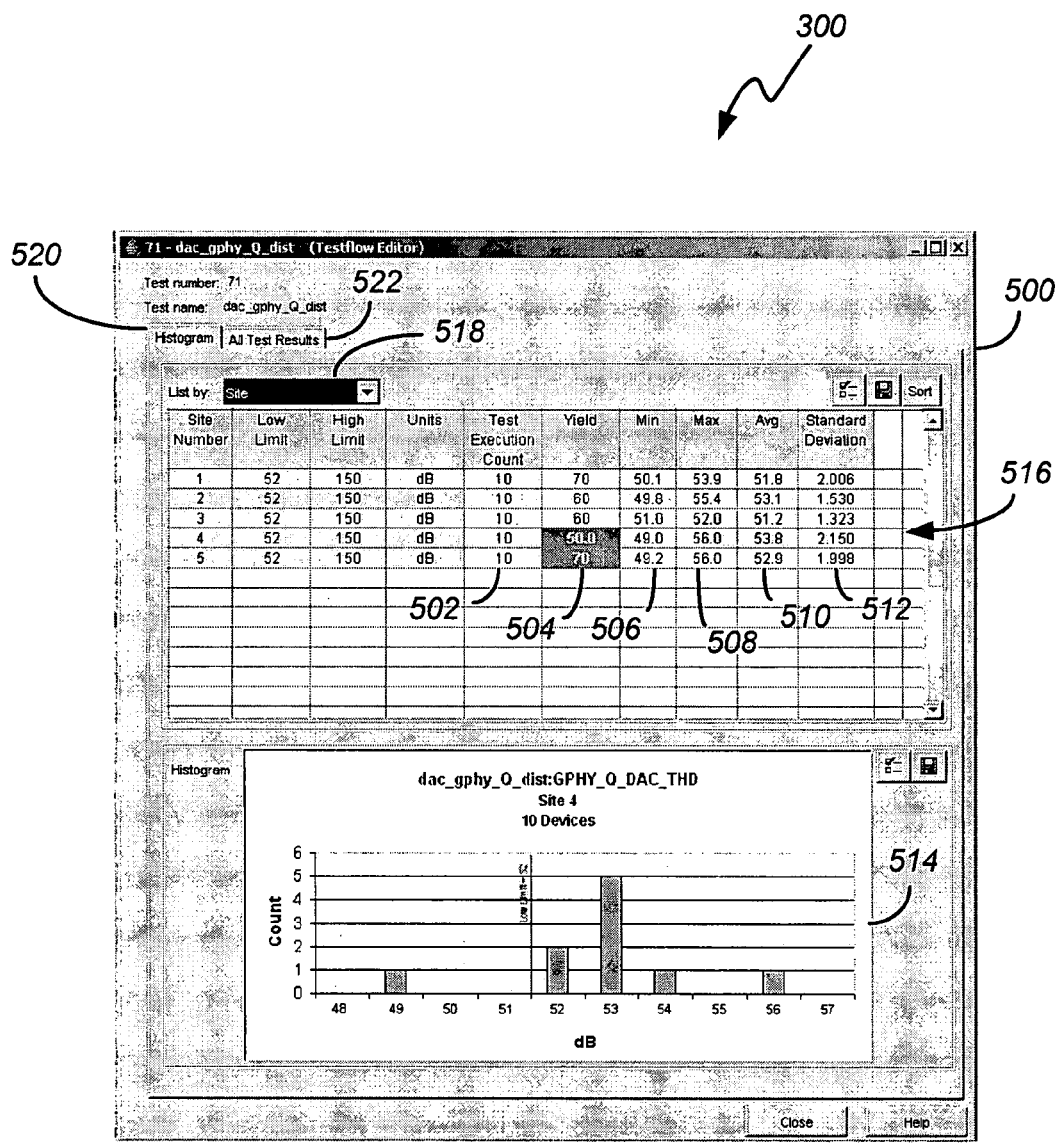
Figure 9:
Figure 10:
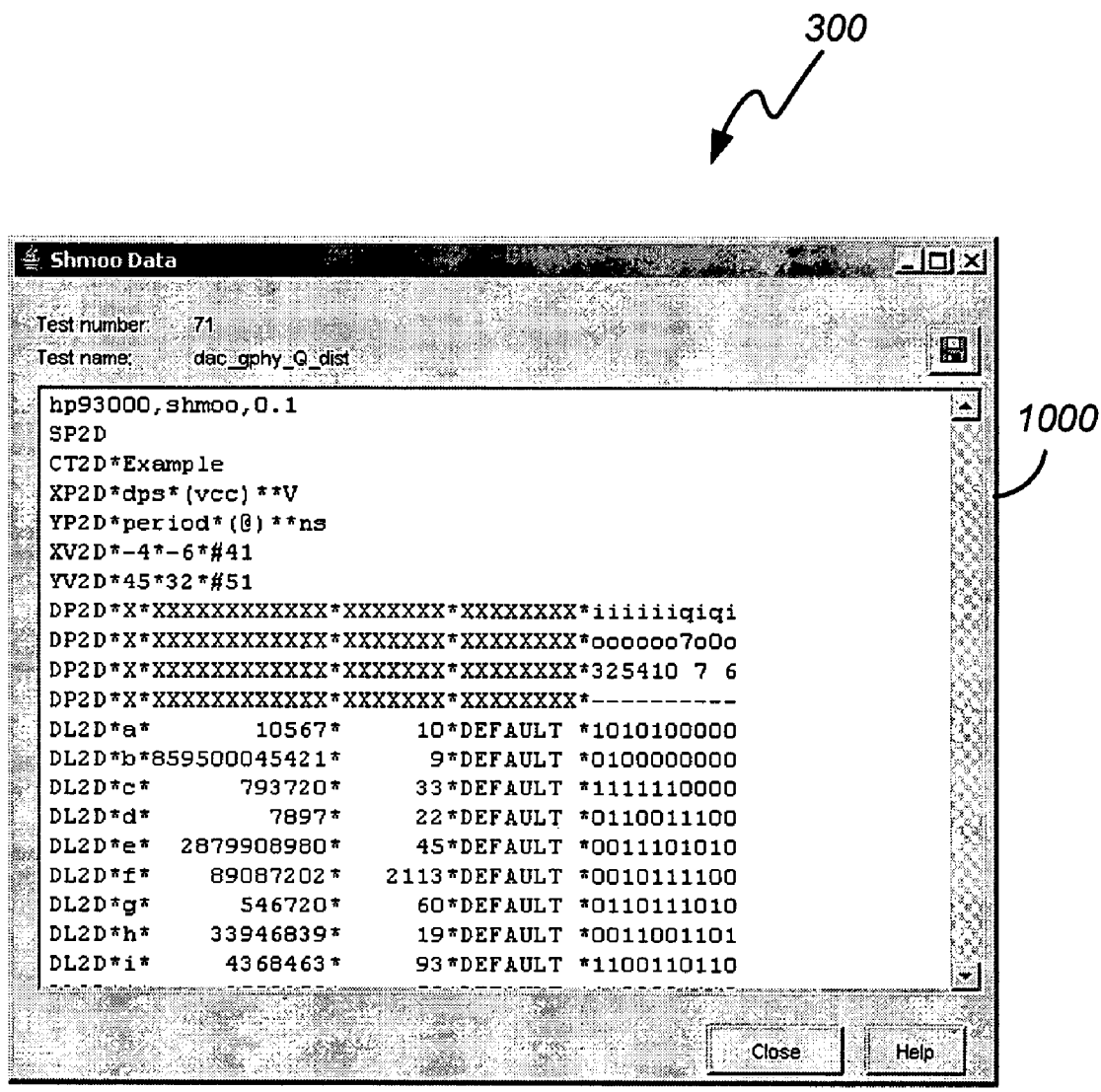
Figure 11:
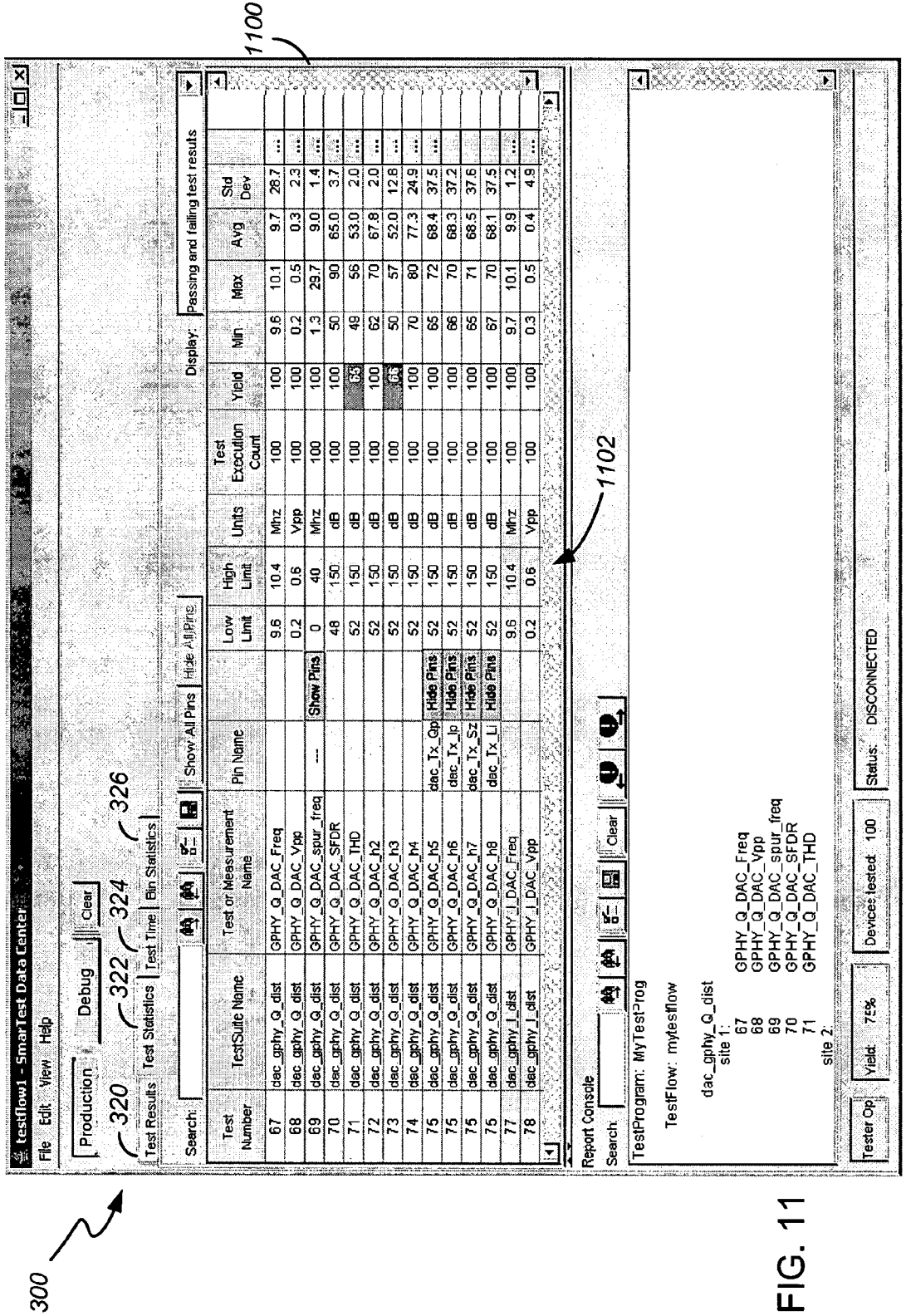

FIG. 5 illustrates an exemplary window 500 that could be launched upon a user pressing the ellipse button 314 shown in FIG. 3. The window 500 displays statistical data 502, 504, 506, 508, 510, 512, 514 corresponding to Test Number 71. The contents of window 500 will be described more fully later in this description.

In addition to the user-selectable mechanisms provided in the window 300 for accessing the data displayed in windows 400 and 500, the window 300 could provide other user-selectable mechanisms, for accessing data such as: additional statistical data, waveform data, or schmoo data (shown in window 1000 in FIG. 10) corresponding to a particular test data entry.

As previously mentioned, FIG. 5 illustrates an exemplary window 500 that could be launched upon a user pressing the ellipse button 314 shown in FIG. 3. The window 500 displays various items of statistical data corresponding to Test Number 71, including, and by way of example, a plurality of numerical statistics 502, 504, 506, 508, 510, 512 and a histogram 514. In one embodiment, the window 500 is a dialog window; and in one embodiment, the dialog window may take the form of a non-modal dialog window (i.e., a dialog window that does not require user input to generate a default display).

The window 500 displays a plurality of statistics 502, 504, 506, 508, 510, 512 in a table 516, although the statistics could alternately be displayed in other forms (e.g., in a list). By way of example, the table 516 comprises a number of columns that provide context for one or more statistics (e.g., the columns labeled "Site Number", "Low Limit", "High Limit" and "Units"), as well as a number of columns that provide the statistics (e.g., the columns labeled "Test Execution Count", "Yield", "Min", "Max", "Avg" and "Standard Deviation"). In alternate embodiments, the table 516 could comprise more or different columns, and in some embodiments, the GUI 300 could provide a mechanism for enabling a user to specify which columns are displayed.

The statistics 502, 504, 506, 508, 510, 512 are compiled "per unit" of a physical quantity, such as tester sites (e.g., Sites 1, 2, 3, 4 and 5) at which Test Number 71 is executed. Alternately, the statistics could be compiled "per unit" of other physical quantities, such as: all devices for which Test Number 71 is executed (see table 600, FIG. 6), wafers for which Test Number 71 is executed (see table 700, FIG. 7), or pins for which Test Number 71 is executed (see table 800, FIG. 8). Different ones of these physical quantities may be selected via a user-operable mechanism, such as a pull-down list 518. Upon user selection of a different physical quantity via the pull-down list 518, the statistics 502, 504, 506, 508, 510, 512 and histogram 514 displayed in the window 500 may be dynamically updated or reconfigured to reflect statistics compiled for the newly selected physical quantity. As shown, statistics corresponding to different units (e.g., sites) of a physical quantity may be displayed in different lines of the table 516. However, if the selected physical quantity is "all devices for which a test is executed", the table 516 may consist of a single line, wherein summary statistics are compiled for all executions of a test (e.g., all executions of Test Number 71).

In addition to providing a mechanism 518 for selecting the physical quantity for which statistics 502, 504, 506, 508, 510, 512 are compiled, the GUI 300 may provide a mechanism for a user to select a particular unit of the physical quantity (e.g., Site 4). In one embodiment, this mechanism is provided as a mouse click for graphically selecting one of the lines of the table 516. Upon selection of one of the physical quantity units, a graphical representation of test data pertaining to the selected unit, such as the histogram 514, may be displayed.

As shown in FIG. 5, the histogram 514 may take the form of a graph that illustrates the count and distribution of test results for any test executions that pertain to the selected physical quantity unit. However, the format of the histogram 514 is exemplary only, and one of ordinary skill in the art will understand that the histogram 514 could alternately be displayed in other ways.

As shown, the statistics 502, 504, 506, 508, 510, 512 and histogram may be displayed in association with a user-selectable mechanism, such as a tab 520 labeled "Histogram". Another user-selectable mechanism, such as a tab 522 labeled "All Test Results", may also be displayed via the window 500. A user may then select the tab 522 to view a table 900 (FIG. 9) showing all executions of a particular test result (e.g., Test Number 71). Alternately, other sorts of user-selectable mechanisms could be provided for a user to reach the "All Test Results" display 900. Or, the information conveyed by the "All Test Results" display 900 could be included within the same window 500 in which the histogram 514 is displayed.

In some embodiments, some or all of the "additional data" displayed by the methods 100 and 200 may be dynamically updated as it is being displayed. For example, statistical data 502, 504, 506, 508, 510, 512, 514 may be displayed, and dynamically updated, during one or more executions of the test to which the statistical data pertains (as well as during the execution of other tests).

In the above description, it has been assumed that the windows 400, 500, 900, 1000 shown in FIGS. 4, 5, 9 & 10 are displayed in response to user selection of one of the buttons 312, 314 displayed via the table 310. Of note, the table 310 is considered a "Test Results" display, as indicated by the "Test Results" tab 320 being displayed in front of the "Test Statistics", "Test Time" and "Bin Statistics" tabs 322, 324, 326. It is contemplated, however, that the windows 400, 500, 900, 1000 shown in FIGS. 4, 5, 9 & 10 may also be accessed from other displays, such as the "Test Statistics" display 1100. See, FIG. 11.

The particular columns and format of the "Test Statistics" display 1100 is beyond the scope of this disclosure. However, it is noted that the particular columns may in some cases comprise a combination of the columns displayed in the "Test Results" display, the statistical data window 500, and/or other columns. It is also noted that, similarly to the "Test Results" display shown in FIG. 3, and by way of example, the test statistics table 1102 may comprise one line per test data entry. The test statistics included in a particular line of the table may therefore be the same or similar to the test statistics displayed by the window 500 when the physical quantity of "all devices" is selected.

What is claimed is:

1. A computer-implemented method, comprising:
   successively displaying a plurality of test data entries via a graphical user interface (GUI), wherein each of the test data entries includes at least a test result identifier and a corresponding test result; and
   for at least one of the test data entries, providing, via the GUI, a user-selectable mechanism that, when selected in a context of a particular and selected one of the test data entries, causes statistical data based on multiple executions of a test identified by the particular and selected one of the test data entries to be displayed via the GUI.

2. The method of claim 1, further comprising:
   providing, via the GUI, a user-operable mechanism for selecting a physical quantity by which to compile the statistical data; and
   upon user selection of the physical quantity, i) compiling the statistical data per unit of the physical quantity, and ii) displaying the statistical data per unit of the physical quantity.

3. The method of claim 2, wherein the user-operable mechanism provides for selection of physical quantities including: all devices for which the test identified in the particular and selected one of the test data entries is executed, wafers for which the test identified in the particular and selected one of the test data entries is executed, pins for which the test identified in the particular and selected one of the test data entries is executed, and tester sites at which the test identified in the particular and selected one of the test data entries is executed.

4. The method of claim 2, further comprising, displaying the statistical data for each unit of the physical quantity in a line of a table, wherein different lines of the table correspond to different units of the physical quantity.

5. The method of claim 2, further comprising:
   providing, via the GUI, a mechanism for a user to select a particular one of the units of the physical quantity; and
   upon selection of the particular one of the units, displaying, via the GUI, a histogram pertaining to any executions of the test performed for the particular one of the units.

6. The method of claim 5, further comprising, displaying the statistical data for each unit of the physical quantity in a line of a table, wherein different lines of the table correspond to different units of the physical quantity, and wherein the mechanism for a user to select a particular one of the units of the physical quantity is a mechanism for graphically selecting one of the lines of the table.

7. The method of claim 1, further comprising:
   displaying the statistical data via a dialog window of the GUI;
   providing the dialog window with a user-operable mechanism for selecting a physical quantity by which to compile the statistical data; and
   upon user selection of the physical quantity, i) compiling the statistical data per unit of the physical quantity, and ii) displaying the statistical data per unit of the physical quantity.

8. The method of claim 7, wherein the dialog window is a non-modal dialog window.

9. The method of claim 1, further comprising, displaying and dynamically updating the statistical data during one or more executions of the test identified by the particular and selected one of the test data entries.

10. The method of claim 1, further comprising:
displaying the plurality of test data entries in a first window of the GUI; and
displaying the statistical data in a second window of the GUI.

11. The method of claim 1, further comprising, displaying the statistical data in a window that is separate from a window displaying the plurality of test data entries, wherein the window in which the statistical data is displayed provides a user-selectable mechanism that, when selected, causes a table showing test results for all executions of the test to be displayed.

12. The method of claim 1, wherein each of the plurality of test data entries further includes at least one item of the statistical data.

13. The method of claim 1, further comprising, providing, via the GUI, a copy of the user-selectable mechanism for each of a plurality of the test data entries.

14. Apparatus, comprising:
computer-readable media; and
computer-readable code, stored on the computer-readable media, including,
code to cause a computer to successively display a plurality of test data entries via a graphical user interface (GUI), wherein each of the test data entries includes at least a test result identifier and a corresponding test result; and
code to cause a computer to provide, for at least one of the test data entries, and via the GUI, a user-selectable mechanism that, when selected in a context of a particular and selected one of the test data entries, causes statistical data based on multiple executions of a test identified by the particular and selected one of the test data entries to be displayed via the GUI.

15. The apparatus of claim 14, further comprising:
code to cause the computer to provide, via the GUI, a user-operable mechanism for selecting a physical quantity by which to compile the statistical data; and
code to, upon user selection of the physical quantity, cause the computer to i) compile the statistical data per unit of the physical quantity, and ii) display the statistical data per unit of the physical quantity.

16. The apparatus of claim 15, wherein the user-operable mechanism provides for selection of physical quantities including: all devices for which the test identified in the particular and selected one of the test data entries is executed, wafers for which the test identified in the particular and selected one of the test data entries is executed, pins for which the test identified in the particular and selected one of the test data entries is executed, and tester sites at which the test identified in the particular and selected one of the test data entries is executed.

17. The apparatus of claim 15, further comprising, code to cause the computer to display the statistical data for each unit of the physical quantity in a line of a table, wherein different lines of the table correspond to different units of the physical quantity.

18. The apparatus of claim 15, further comprising:
code to cause the computer to provide, via the GUI, a mechanism for a user to select a particular one of the units of the physical quantity; and
code to, upon selection of the particular one of the units, cause the computer to display, via the GUI, a histogram pertaining to any executions of the test performed for the particular one of the units.

19. The apparatus of claim 18, further comprising, code to cause the computer to display the statistical data for each unit of the physical quantity in a line of a table, wherein different lines of the table correspond to different units of the physical quantity, and wherein the mechanism for a user to select a particular one of the units of the physical quantity is a mechanism for graphically selecting one of the lines of the table.

20. The apparatus of claim 14, further comprising:
code to cause the computer to display the statistical data via a dialog window of the GUI;
code to cause the computer to provide the dialog window with a user-operable mechanism for selecting a physical quantity by which to compile the statistical data; and
code to, upon user selection of the physical quantity, cause the computer to i) compile the statistical data per unit of the physical quantity, and ii) display the statistical data per unit of the physical quantity.

21. The apparatus of claim 20, wherein the dialog window is a non-modal dialog window.

22. The apparatus of claim 14, further comprising code to cause the computer to display and dynamically update the statistical data during one or more executions of the test identified by the particular and selected one of the test data entries.

23. The apparatus of claim 14, further comprising:
code to cause the computer to display the plurality of test data entries in a first window of the GUI; and
code to cause the computer to display the statistical data in a second window of the GUI.

24. The apparatus of claim 14, further comprising, code to cause the computer to display the statistical data in a window that is separate from a window displaying the plurality of test data entries, wherein the window in which the statistical data is displayed provides a user-selectable mechanism that, when selected, causes a table showing test results for all executions of the test to be displayed.

25. The apparatus of claim 14, wherein each of the plurality of test data entries further includes at least one item of the statistical data.

26. The apparatus of claim 14, further comprising, code to cause the computer to provide, via the GUI, a copy of the user-selectable mechanism for each of a plurality of the test data entries.

27. The apparatus of claim 14, wherein the computer-readable code provides the user-selectable mechanism for each of at least one of the test data entries, and wherein each user-selectable mechanism is a graphical button displayed with a corresponding one of the test data entries.

28. The apparatus of claim 14, wherein the computer-readable code provides the user-selectable mechanism as a common user-selectable mechanism, the common user-selectable mechanism i) causing different statistical data to be displayed via the GUI when ii) the user-selectable mechanism is selected in the contexts of different selected ones of the test data entries.

29. The apparatus of claim 14, wherein the computer-readable code provides the user-selectable mechanism as a user-selectable mechanism that is configured by selection of a particular one of the test data entries.

* * * * *